US008141118B2

(12) United States Patent
Regan et al.

(10) Patent No.: US 8,141,118 B2
(45) Date of Patent: Mar. 20, 2012

(54) DATA BROADCASTING RECEIVER POWER MANAGEMENT

(75) Inventors: Tim Regan, Cambridge (GB); Pablo Rodriguez, Cambridge (GB); Ken Wood, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1159 days.

(21) Appl. No.: 10/898,870

(22) Filed: Jul. 26, 2004

(65) Prior Publication Data
US 2006/0020972 A1  Jan. 26, 2006

(51) Int. Cl.
G06F 3/00 (2006.01)
G06F 13/00 (2006.01)
H04N 5/445 (2006.01)

(52) U.S. Cl. .......................... 725/58; 725/100
(58) Field of Classification Search ................ 725/58
See application file for complete search history.

(56) References Cited

U.S. PATENT DOCUMENTS

| 5,345,606 | A | * | 9/1994 | Duckeck et al. | 455/186.1 |
| 5,485,219 | A | * | 1/1996 | Woo | 348/460 |
| 5,659,653 | A | * | 8/1997 | Diehl et al. | 386/248 |
| 5,924,017 | A | | 7/1999 | Pinter et al. | |
| 5,956,455 | A | * | 9/1999 | Hennig | 386/245 |
| 6,173,112 | B1 | * | 1/2001 | Gruse et al. | 386/291 |
| 6,226,794 | B1 | * | 5/2001 | Anderson et al. | 725/131 |
| 6,324,544 | B1 | | 11/2001 | Alam et al. | |
| 6,452,644 | B1 | * | 9/2002 | Shimakawa et al. | 348/730 |
| 6,463,265 | B1 | | 10/2002 | Cohen et al. | |
| 6,560,777 | B2 | | 5/2003 | Blackketter et al. | |
| 6,711,572 | B2 | | 3/2004 | Zakharov et al. | |
| 6,760,840 | B1 | | 7/2004 | Shimbo et al. | |
| 6,996,584 | B2 | | 2/2006 | White et al. | |
| 7,039,656 | B1 | | 5/2006 | Tsai et al. | |
| 7,281,024 | B1 | | 10/2007 | Banerjee et al. | |
| 7,290,018 | B2 | | 10/2007 | Muecklich et al. | |
| 7,320,010 | B2 | | 1/2008 | Peng | |
| 7,653,018 | B2 | | 1/2010 | Regan et al. | |
| 2001/0007103 | A1 | | 7/2001 | Breiter et al. | |
| 2002/0052225 | A1 | * | 5/2002 | Davis et al. | 455/567 |
| 2002/0087989 | A1 | * | 7/2002 | Proidl et al. | 725/58 |

(Continued)

FOREIGN PATENT DOCUMENTS

EP  1237097  9/2002

(Continued)

OTHER PUBLICATIONS

Korean PT Appln. 10-2005-62807; First Office Action and English translation dated Jul. 27, 2011.

(Continued)

*Primary Examiner* — Andrew Koenig
*Assistant Examiner* — Ricky Chin

(57) ABSTRACT

Systems and methods for data broadcasting and power management techniques for data broadcast receiving devices are disclosed. A data broadcast receiving device receives a broadcast schedule from a data broadcast server and correlates the broadcast schedule with profile information in the data broadcast receiving device to determine a schedule for activating a receiver module in the data broadcast receiving device. The receiver is activated in accordance with the schedule. The broadcast schedule may include a content identifier that identifies content associated with a specific broadcast schedule. A data broadcast may include metadata that identifies the content of the broadcast. The receiver may use the content identifier and the metadata to determine whether the broadcast data corresponds to the data scheduled for broadcast, and may implement an error routine in the event that there is not a correspondence.

18 Claims, 8 Drawing Sheets

U.S. PATENT DOCUMENTS

| | | | |
|---|---|---|---|
| 2002/0152463 A1* | 10/2002 | Dudkiewicz | 725/46 |
| 2002/0188947 A1* | 12/2002 | Wang et al. | 725/45 |
| 2003/0028871 A1* | 2/2003 | Wang et al. | 725/9 |
| 2003/0028901 A1 | 2/2003 | Shae et al. | |
| 2003/0055949 A1 | 3/2003 | Coulombe et al. | |
| 2003/0092376 A1* | 5/2003 | Syed | 455/3.06 |
| 2003/0114136 A1 | 6/2003 | Dietz et al. | |
| 2003/0163528 A1 | 8/2003 | Banerjee et al. | |
| 2003/0221196 A1* | 11/2003 | Connelly | 725/110 |
| 2004/0054764 A1 | 3/2004 | Aderton et al. | |
| 2004/0064835 A1* | 4/2004 | Bellwood et al. | 725/87 |
| 2004/0073915 A1 | 4/2004 | Dureau | |
| 2004/0133907 A1 | 7/2004 | Rodriguez | |
| 2004/0158855 A1* | 8/2004 | Gu et al. | 725/39 |
| 2004/0204003 A1* | 10/2004 | Soerensen et al. | 455/550.1 |
| 2004/0267741 A1 | 12/2004 | Galindo-Legaria et al. | |
| 2005/0080823 A1 | 4/2005 | Collins | |
| 2005/0125525 A1 | 6/2005 | Zhou et al. | |
| 2005/0135429 A1 | 6/2005 | Bingham et al. | |
| 2005/0229093 A1 | 10/2005 | Campbell et al. | |
| 2007/0180075 A1 | 8/2007 | Chasman et al. | |
| 2008/0037593 A1 | 2/2008 | Friedman et al. | |
| 2009/0013368 A1* | 1/2009 | Mimura et al. | 725/118 |
| 2009/0310937 A1* | 12/2009 | Ellis et al. | 386/83 |

FOREIGN PATENT DOCUMENTS

| | | |
|---|---|---|
| JP | 07-121935 | 5/1995 |
| JP | 11-055599 | 2/1999 |
| JP | 2002-044586 | 2/2002 |
| JP | 2002-315023 | 10/2002 |
| JP | 2003-134250 | 5/2003 |
| JP | 2003-309734 | 10/2003 |
| WO | WO02/01852 | 1/2002 |
| WO | WO0207458 | 1/2002 |
| WO | WO2004/039110 | 5/2004 |

OTHER PUBLICATIONS

"European Search Report", Mailed Date: Mar. 25, 2011, Application No. EP/05014372, Filed Date: Mar. 28, 2011, pp. 7.

Chinese PT Appln. 200510088223.9 Office Action and English translation dated Jan. 26, 2011.

Japanese PT Appln. 2005-199672 Office Action (English translation) dated Feb. 15, 2011.

Chinese PT Appln. 200510088223.9 Second Office Action and English translation dated Jul. 21, 2011.

EP Patent Application 05014371.8; Extended European Search Report dated Jul. 29, 2010.

EP Patent Application 05014371.8; First Office Action dated Aug. 11, 2011.

KR Patent Application 10-2005-0065959; First Office Action dated Aug. 30, 2011 (English translation).

* cited by examiner

300

PROCESSING UNIT 316

MEMORY 318

POWER MANAGER 324

RECEIVE SCHEDULE DATA FILES 330

PROFILE MANAGER 322

USER PROFILE DATA FILES 328

OPERATING SYSTEM 320

400

| Subscriber ID: ABC123 402 | |
|---|---|
| Sports 410 | Soccer 412 Baseball 414 |
| Finance 420 | Stock Quotes 422 Mortgage Rates 424 |
| Business 430 | Weekly Update 432 |
| Entertainment 440 | New Hits 442 Fallen Stars 444 |

| Document Number 510 | Content 520 | Broadcast Periodicity 530 | Start Time 540 | Stop Time 550 |
|---|---|---|---|---|
| Document 1 | Soccer | 60 Minutes | 06:00:00 | 06:05:00 |
| Document 2 | Baseball | 20 Minutes | 06:05:00 | 06:07:00 |
| Document 3 | Fallen Stars | 300 Minutes | 12:25:00 | 12:35:00 |
| Document 4 | Weekly Update | 600 Minutes | 10:00:00 | 11:00:00 |
| Document 5 | Mortgage Rates | 60 Minutes | 08:45:00 | 08:55:00 |

●
●

| Document n | New Hits | 300 Minutes | 12:15:00 | 12:25:00 |
|---|---|---|---|---|

| Content 720 | Broadcast Periodicity 730 | Start Time 740 | Stop Time 750 |
|---|---|---|---|
| Soccer | 60 Minutes | 06:00:00 | 06:05:00 |
| Baseball | 20 Minutes | 06:05:00 | 06:07:00 |
| Fallen Stars | 300 Minutes | 12:25:00 | 12:35:00 |
| Weekly Update | 600 Minutes | 10:00:00 | 11:00:00 |
| Mortgage Rates | 60 Minutes | 08:45:00 | 08:55:00 |
| New Hits | 300 Minutes | 12:15:00 | 12:25:00 |

*Fig. 7*

DATA BROADCASTING RECEIVER POWER MANAGEMENT

TECHNICAL FIELD

The described subject matter relates to electronic communication, and more particularly to data broadcasting receiver power management.

BACKGROUND

The term "data broadcasting" (also referred to sometimes as "datacasting") refers generally to the widespread distribution of the same content to a plurality (typically a large number) of receivers. Advances in electronic computing and communication technology, particularly wireless communication technology, have enabled data broadcasting techniques to be applied in wireless communication markets to service mobile receivers. Examples of such technologies include Digital Audio Broadcast or Digital Video Broadcast. The content is broadcast to multiple clients simultaneously using the same communication channel (e.g. the same time slot or frequency), thereby efficiently using network resources. Regardless of the number of receivers, the server only sends one copy of the content, thus minimizing the impact in the server's capacity.

Conventional data broadcasting systems are push systems, which do not permit users to specify the content that is pushed through the broadcast communication channel. Rather, data broadcasting systems pre-select a number of documents to be broadcasted. Documents are placed in a queue, sometimes referred to as a "carousel" and broadcast sequentially in a rotating manner.

Wireless receiving devices are frequently operated using a stored, finite power source such as, e.g., a battery. Wireless receivers consume a significant amount of power, which drains the power source. Improved power management techniques would enable data broadcasting receivers services to use the limited power resource more effectively.

SUMMARY

Implementations described and claimed herein provide systems and methods for data broadcasting and power management techniques for data broadcast receiving devices. In exemplary implementations a data broadcast receiving device receives a broadcast schedule from a data broadcast server and correlates the broadcast schedule with profile information in the data broadcast receiving device to determine a schedule for activating a receiver module in the data broadcast receiving device. The receiver is activated in accordance with the schedule.

In exemplary implementations the broadcast schedule may include a content identifier that identifies content associated with a specific broadcast schedule. A data broadcast may include metadata that identifies the content of the broadcast. The receiver may use the content identifier and the metadata to determine whether the broadcast data corresponds to the data scheduled for broadcast, and may implement an error routine in the event that there is not a correspondence.

In one exemplary implementation a method of receiving a data broadcast is provided. The method comprises receiving, at a client computing device, broadcast schedule information from a broadcast server device; correlating the broadcast schedule information with profile information for the client computing device; and selectively activating a receiver module in the client computing device at times indicated in the broadcast schedule information to receive data specified in the profile information.

In another exemplary implementation a method of receiving data in a broadcast receiving device is provided. The method comprises receiving, at the broadcast receiving device, a broadcast schedule from a broadcast server, wherein the broadcast schedule includes a time schedule and a content identifier; selectively activating a receiver in the broadcast receiving device in accordance with a time schedule determined from the broadcast schedule; receiving broadcast data at a time indicated in the broadcast schedule, wherein the broadcast data includes a content portion and a metadata portion that describes the content portion; and implementing an error routine if the metadata portion of the broadcast data does not match the content identifier of the broadcast schedule.

BRIEF DESCRIPTION OF THE DRAWINGS

FIG. 4 is an illustration of an exemplary data structure for subscriber profile information.

FIG. 5 is an illustration of a data structure representing a data broadcasting carousel.

FIG. 7 is an illustration of an exemplary data structure for a power management routine for a receiver.

DETAILED DESCRIPTION

Exemplary implementations of methods, systems, and computer program products for managing power in a data broadcasting receiver are described herein. In certain implementations, subscriber preference information is used to selectively activate a receiver in accordance with a broadcast schedule. In certain implementations, error management routines may be invoked if the broadcast content does not correspond to the content in the subscriber preference.

Exemplary Operating Environment

Figure 1:
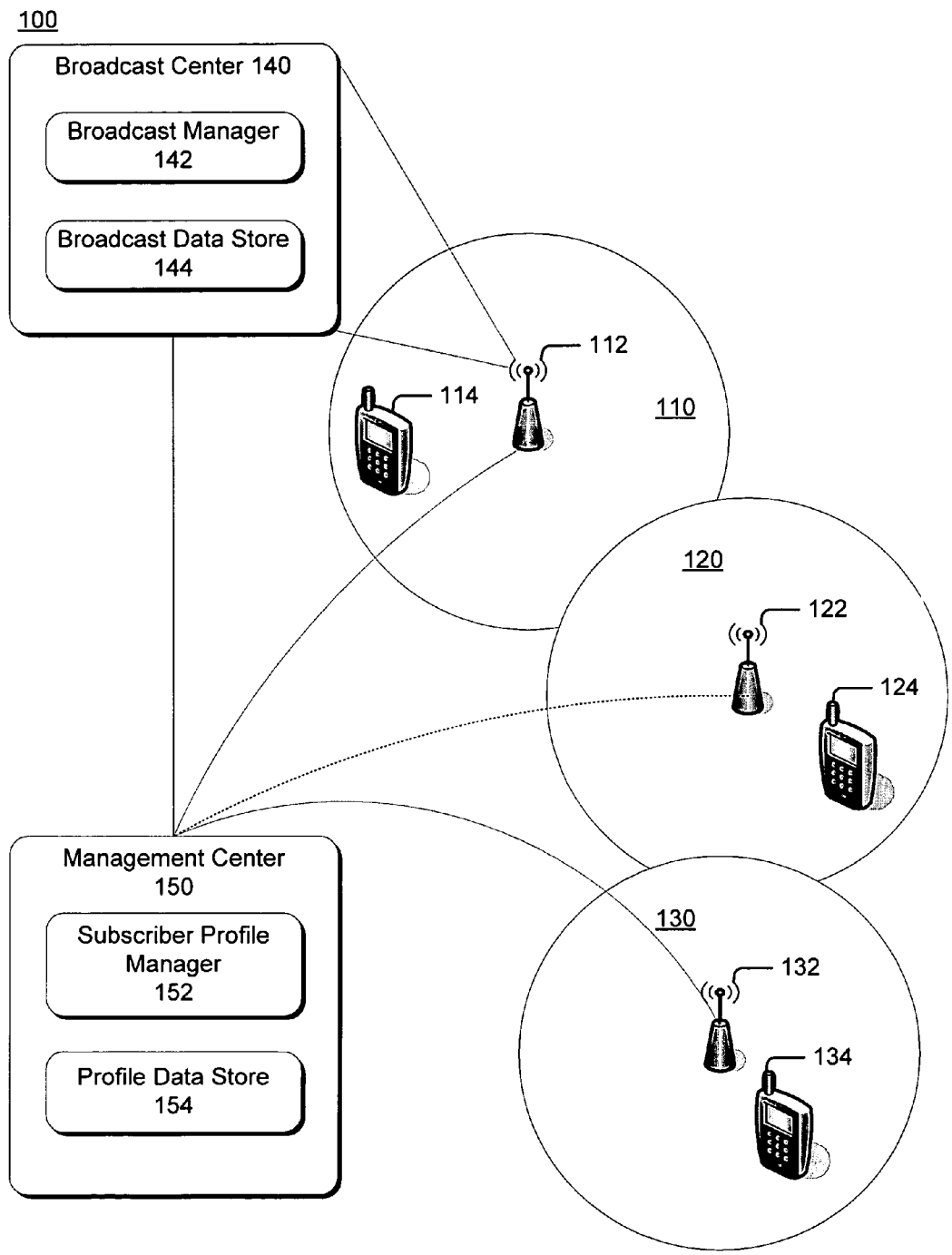
FIG. 1 is a schematic illustration of an exemplary implementation of a data broadcasting network.

FIG. 1 is a schematic illustration of an exemplary implementation of a data broadcasting environment 100 in which the subject matter described herein may be implemented. It will be appreciated that the environment 100 depicted in FIG. 1 is merely an exemplary environment and it not intended to suggest any limitation as to particular uses or functionality. The subject matter described herein may be implemented in a wide variety of data distribution environments including, but not limited to, radio, television, and satellite networks, digital radio systems, broadcast disk systems, publish/subscribe systems, Internet-based broadcasting systems, and the like.

Referring to FIG. 1, the environment 100 includes at least one head end 112 that broadcasts data throughout a broadcast region 110 to one or more receivers 114 that subscribe to a data broadcasting service transmitted from head end 112. As used herein, the term broadcast and its derivatives should be construed broadly to encompass any form of modulating, coding, and/or transmitting of a communication signal across a communication medium, wired or wireless. Similarly, as used herein, the term "subscribe" should be construed broadly to encompass any form of receiving, demodulating, and/or decoding of data broadcast head end 112.

In the implementation depicted in FIG. 1 the broadcast environment 100 includes multiple broadcast regions 110, 120, 130, each of which includes a head end 112, 122, 132. Each head end 112, 122, 132 broadcasts data throughout its respective broadcast region. Although FIG. 1 illustrates three separate head ends 112, 122, 132 defining three broadcast regions 110, 120, 130, it will be appreciated that the specific number of regions is not important, and may vary depending upon, e.g., the geographic size of the operating environment, transmission power constraints, and interference and/or obstructions of the signal(s) broadcast from the respective head ends 112, 122, 132. Also, it will be appreciated that there need not be a one-to-one correspondence between head ends and broadcast regions.

Head ends 112, 122, 132 further include infrastructure necessary for broadcasting a data signal. In a wireless communication environment such infrastructure might include equipment for encoding, modulating, and transmitting or transceiving a radio frequency (RF) signal at a specific frequency (or frequencies), or in accordance with a specific multi-frequency protocol. Such equipment is readily commercially available, and is known to those skilled in the art. The particular encoding, modulating, and/or transmission scheme is not important.

The broadcast environment 100 further includes a plurality of receivers 114, 124, 134, which may be embodied as wireless communication devices such as, e.g., personal computers (PCs), laptop computers, personal digital assistants (PDAs), mobile phones, or the like. In one exemplary implementation receivers 114, 124, 134 include an uplink communication system that enables a server to determine location information associated with the receivers 114, 124, 134. The location information does not need to precisely define the location of the user. In one implementation the location information simply indicates the current head end 112, 122, 132 is providing service to a given receiver. In such a implementation each receiver 114, 124, 134 includes an identifier that uniquely identifies the receiver from all other receivers in the system. The unique identifier may be transmitted from the receiver 114, 124, 134 to the respective head end 112, 122, 132 providing service to the receiver, e.g., on a control channel or on a data channel. Such transmissions could make use of SMS notifications, or small IP messages sent from the client's device to a database using traditional two way wireless communication systems (e.g. GSM/CDMA).

In an exemplary implementation each head end 112, 122, 132 is assigned a unique identifier within broadcast environment 100. A head end 112, 122, 132 may be identified by a network address, station name, a carrier frequency, or other distinct designation. A data broadcast from a head end 112, 122, 132 to a receiver 114, 124, 134 takes place over a communication channel. In an exemplary implementation the communication channel(s) may be defined by modulating a carrier wave in accordance with any conventional RF broadcasting technique such as, e.g., TDMA, FDMA, CDMA, or the like. The transmitted content may include various forms of data including, e.g., text, audio, video, and may also include control signals including, e.g., timing signals, power signals, location signals, etc. Control signals may be broadcast in-band, or on a separate control channel.

Broadcast environment 100 further includes a broadcast center 140 for managing the broadcast operations of one or more head ends 112, 122, 132, and a management center 150 for managing subscriber profile information and other network management information. Broadcast center 140 includes a broadcast manager 142 and a broadcast data store 144. Management center 150 includes a subscriber profile manager 152 and a subscriber data profile 154. Broadly, the broadcast center 140 cooperates with the management center 150 to manage subscriber information, network information, and data broadcasting from one or more of the respective head ends 112, 122, 132 of the operating environment 100.

In one exemplary implementation broadcast center 140 and management center 150 may reside on a single computing device such as, e.g., a server computer associated with broadcasting environment 100. In alternate implementations the responsibility for broadcast management and subscriber profile management may be distributed between the head ends and the management center 150 in a different manner, or may be consolidated in either the management center 150 or the head ends 112, 122, 132. For example, the environment 100 may include a single management center 150, but each head end 112, 122, 132 may include a broadcast center 140.

In an exemplary implementation the respective head ends 112, 122, 132 cooperate with the management center 150 to implement a data broadcast network that may cover a geographic region ranging in size from a region as small as a specific building or a corporate or academic campus to a region as large an entire country or continent. Broadly, the head ends 112, 122, 132 cooperate with the management center 150 to manage subscriber information, network information, and data broadcasting.

Figure 2:
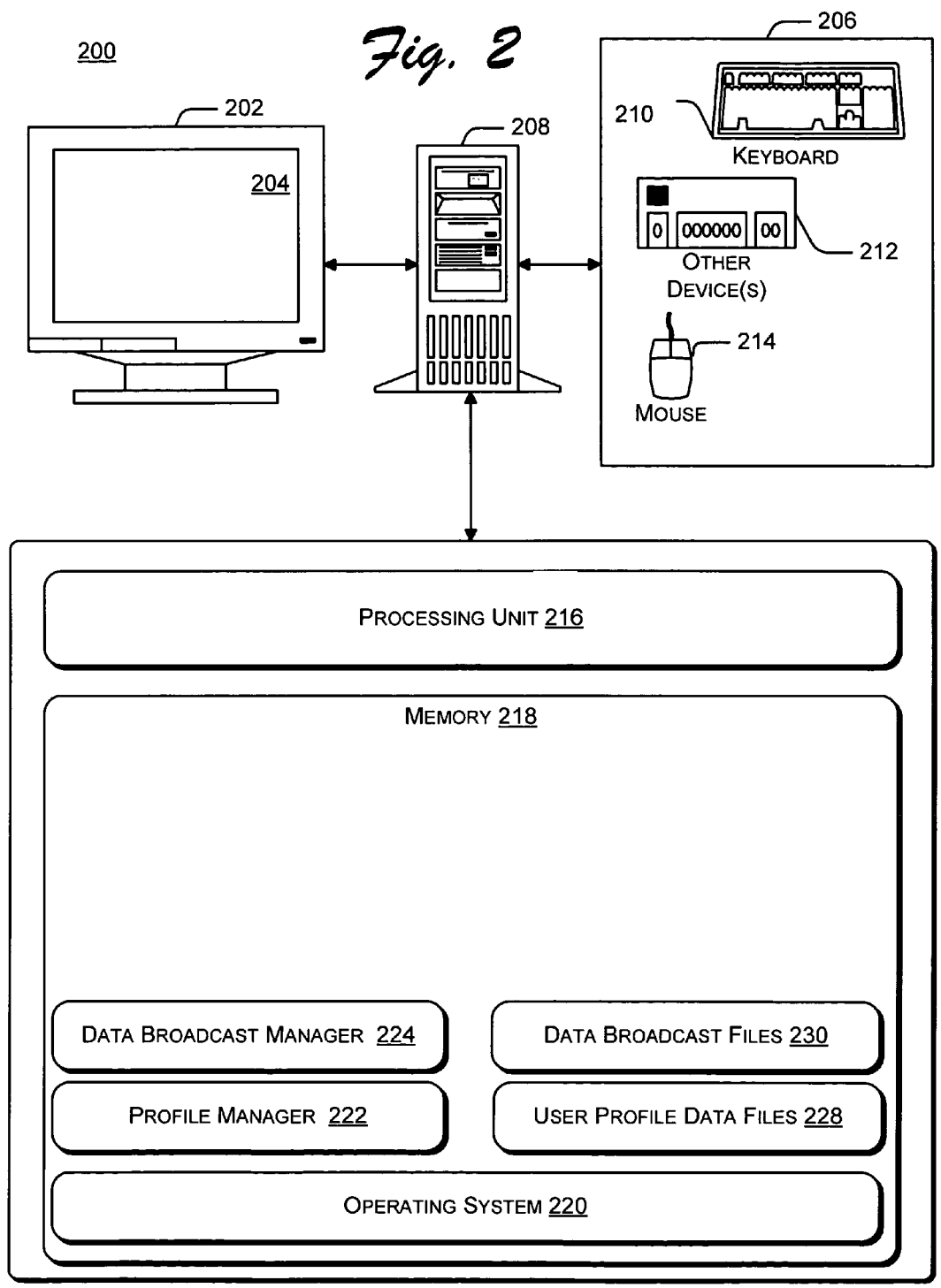
FIG. 2 is a schematic depiction of an exemplary data broadcasting system data broadcasting.

FIG. 2 is a schematic illustration of an exemplary computer system 200 adapted to include a broadcast center 140 and a management center 150. This computer system 200 includes a display 202 having a screen 204, one or more user-input devices 206, and a computer 208. The user-input devices 206 can include any device allowing a computer to receive a developer's input, such as a keyboard 210, other device(s) 212, and a mouse 214. The other device(s) 212 can include a touch screen, a voice-activated input device, a track ball, and any other device that allows the system 200 to receive input from a developer. The computer 208 includes a processing unit 216 and random access memory and/or read-only memory 218.

Memory 218 includes an operating system 220 for managing operations of computer 208. In an exemplary implementation one or more application programs executable on the processing unit 216 reside in memory 218, including a profile manager 222, and a broadcast manager 224. Memory 218 further includes one or more data files including user profile data files 228 and data broadcast files 230. Operation of the system 200 is explained in greater detail below.

Figure 3:
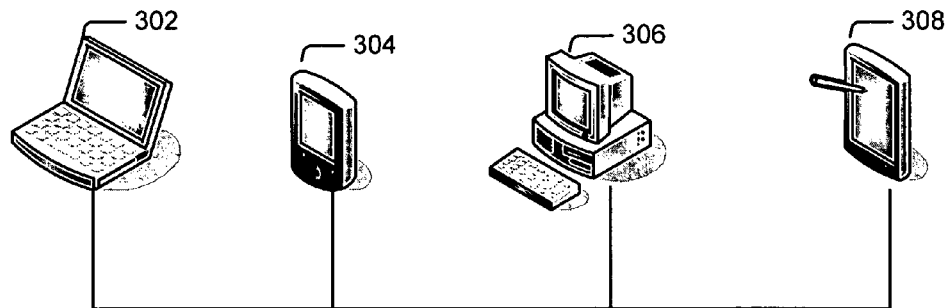
FIG. 3 is a schematic depiction of an exemplary power management module in a data broadcasting receiver.

FIG. 3 is a schematic depiction of an exemplary power management module in a data broadcasting receiver. The data broadcasting receiver may be embodied in any computer-based processing device such as, e.g., a laptop computer 302, a personal digital assistant (PDA) 304 a personal computer (PC) 306, or a tablet PC 308. Each of these devices includes a processing unit 316 and a memory 318.

Memory 318 includes an operating system 320 for managing operations of the device. In an exemplary implementation one or more application programs executable on the processing unit 316 reside in memory 318, including a profile manager 322 and a power manager 324. Memory 318 further includes one or more data files including user profile data files 328 and receiver schedule data files 330.

FIG. 4 is an illustration of an exemplary data structure for subscriber profile information. In an exemplary implementation a subscriber to the data broadcasting system maintains a subscriber profile including a subscriber identity and specifying particular categories of information of interest to the subscriber. This information may be stored in a suitable memory location such as, e.g., the user profile data files 228 stored in the memory 218 of computer 208. The file may be embodied as, e.g., a relational database. In an exemplary implementation the subscriber profile information may also be stored in the memory 318 of the data broadcasting receiver, e.g., in the user profile data files 328. It will be appreciated that the subscriber profile information data structure may include other specific personal information or links to other specific personal information such as, e.g., electronic mail, electronic calendars, etc.

Referring to FIG. 4, the subscriber profile information data structure includes a subscriber ID data field 400 and a one or more categories of information of interest. In the exemplary data structure illustrated in FIG. 4, the categories of interest include sports 410, finance 420, business 430, and entertainment 440. Each category may include sub-categories specifying in further detail information of interest to the subscriber identified by subscriber ID 400. In the exemplary implementation illustrated in FIG. 4 the sports category 400 includes a soccer sub-category 412 and a baseball sub-category 414. The finance category 420 includes a stock quotes sub-category 422 and a mortgage rates sub-category 424. The business category 430 includes a weekly update sub-category 432, and the entertainment category includes a new hits sub-category 442 and a fallen stars sub-category 444. It will be appreciated that the data structure depicted in FIG. 4 may be expanded to include additional layers of sub-categories further detailing information of interest to a subscriber. By way of example, the soccer sub-category 412 may be expanded to include information about one or more specific teams or the stock quotes category 442 may be expanded to include information about one or more specific stocks.

FIG. 5 is an illustration of a data structure representing a data broadcasting schedule 500 for data broadcasting system 100. The data broadcasting schedule 500 may be stored in the broadcast data store 144, e.g., as one of the broadcast data files 230 stored in the memory 218 of computer 208. In an exemplary implementation the data broadcasting schedule 500 may be represented in tabular format as a series of documents 510 for broadcast, each of which is identified by a content identifier 520 that describes the content of the document. The broadcast schedule 500 further includes a broadcast periodicity 530 associated with the document that defines the periodicity with which the document is broadcast. The broadcast schedule further includes a start time 540 and a stop time 550 for each document. By way of illustration, the broadcast schedule depicted in FIG. 5 reflects that document number 1 in the broadcast schedule includes soccer information, and is broadcast every sixty minutes beginning at 06:00:00 and terminating at 06:05:00.

In an exemplary implementation the data broadcast manager 224 maintains the data broadcast schedule 500. The data broadcast manager 224 may include a user interface that permits a user to add documents to or delete documents from the data broadcast schedule 500, and/or to modify the periodicity with which documents are broadcast. The broadcast duration is a function of the amount of data to be broadcast and the bandwidth available to the data broadcasting system 100. When a scheduled broadcast is complete the broadcast manager 224 may update the start time 540 and stop time 550 to reflect the next broadcast of the document.

The data broadcast files 230 may also include the content to be broadcast. By way of example, the soccer document may include scores and other information about soccer teams, the stock quotes may document may include current quotes for particular stocks. This information may be updated periodically by the data broadcast manager 224 or by another application program executing on the processing unit 216 of computer 208. When the scheduled broadcast time for a document arrives, the broadcast manager retrieves the document from the data broadcast files 230 and broadcast the document over from one or more head ends 112, 122, 132 in the system 100. In this regard, it will be appreciated that the broadcast schedule may be specific to each head end 112, 122, 132, such that the broadcast schedule is different in each broadcast region 110, 120, 122.

Exemplary Operations

In exemplary implementations information in the user profile 400 and the broadcast schedule 500 are used to construct a power management schedule for the receiver (or transceiver) of the receiving device, such that the receiver is activated at times when information of interest to the subscriber is being broadcast by the head end 112, 122, 132 of the respective broadcast region 110, 120, 130. In one exemplary implementation the broadcast schedule 500 is broadcast periodically, e.g., on a control channel, and the power management schedule is constructed by the power manager module 324 of the receiver device. In an another implementation the power management schedule may be constructed by the profile manager 222 or another application in the memory module 218 of the computer 208 and broadcast over the system 100 with an identifier that identifies the subscriber ID. The power management schedule may be encoded or encrypted for broadcast and decoded at the receiving unit.

Figure 6:
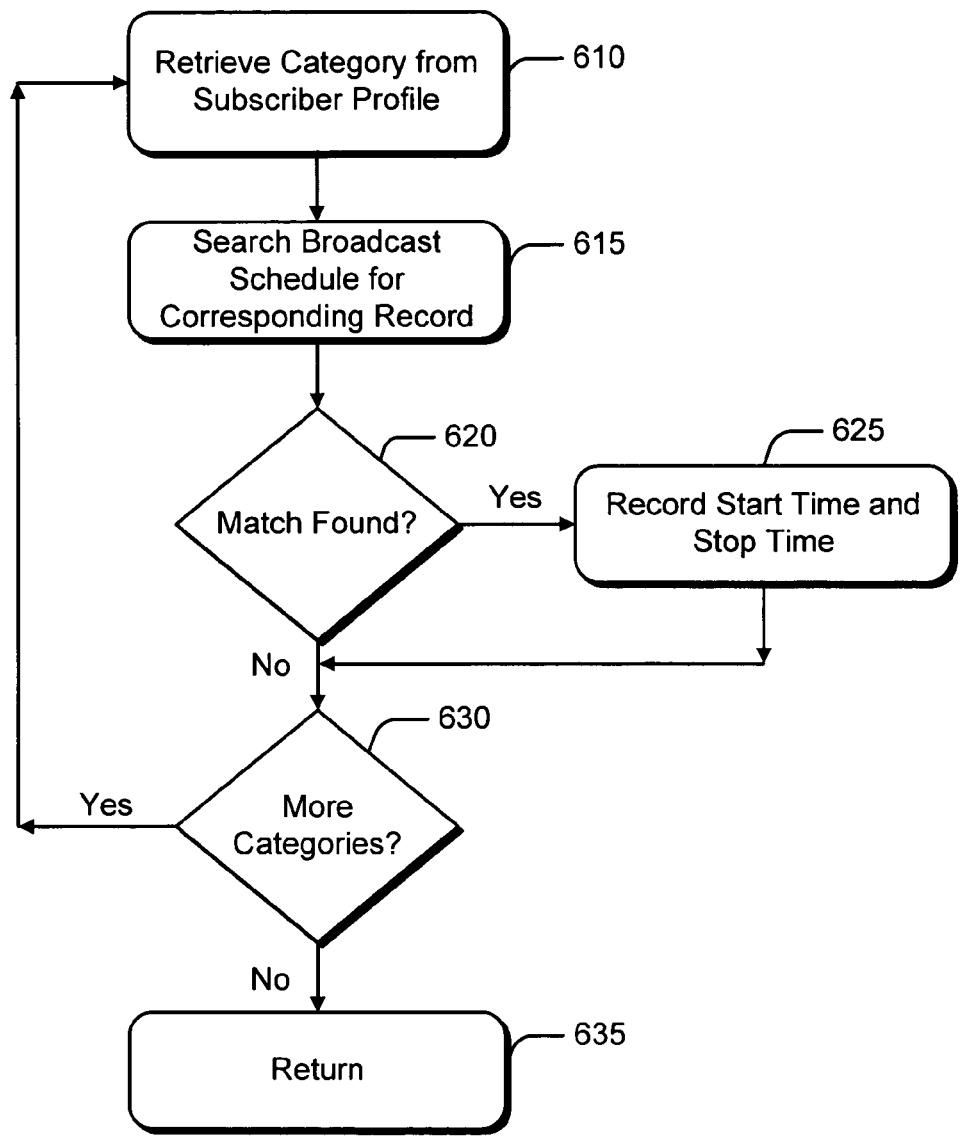
FIG. 6 is a flowchart illustrating operations in an exemplary process for constructing a power management schedule.

FIG. 6 is a flowchart illustrating operations in an exemplary method for constructing a power management schedule for a receiver. At operation 610 a category of interest is retrieved from the subscriber's profile and at operation 615 the broadcast schedule 500 is searched for a corresponding record. If a corresponding record is found at operation 620 then the start time and stop time for the information of interest is recorded (operation 625). Control then passes to operation 630, and if there are more categories in the subscriber profile then control passes back to operation 610 and the next record in the subscriber profile is processed. By contrast, if there are no more records in the subscriber profile then control is returned to the calling routine.

The operations of FIG. 6 construct a power management schedule for the receiver of the subscriber's receiving device 302, 304, 306, 308. FIG. 7 is an illustration of an exemplary power management schedule 700 for a receiver. The power management schedule comprises may be embodied as data structure comprising a plurality of entries for content of interest 720 and an associated start time 740 and stop time 750 for each entry. Optionally, the power management schedule may include the periodicity of broadcast 720 for each content entry 720. In an exemplary implementation the power management schedule 700 may be stored in the receive schedule data files 330 in the memory 318 of the receiving device. The particular configuration of the power management schedule is not critical.

Figure 8:
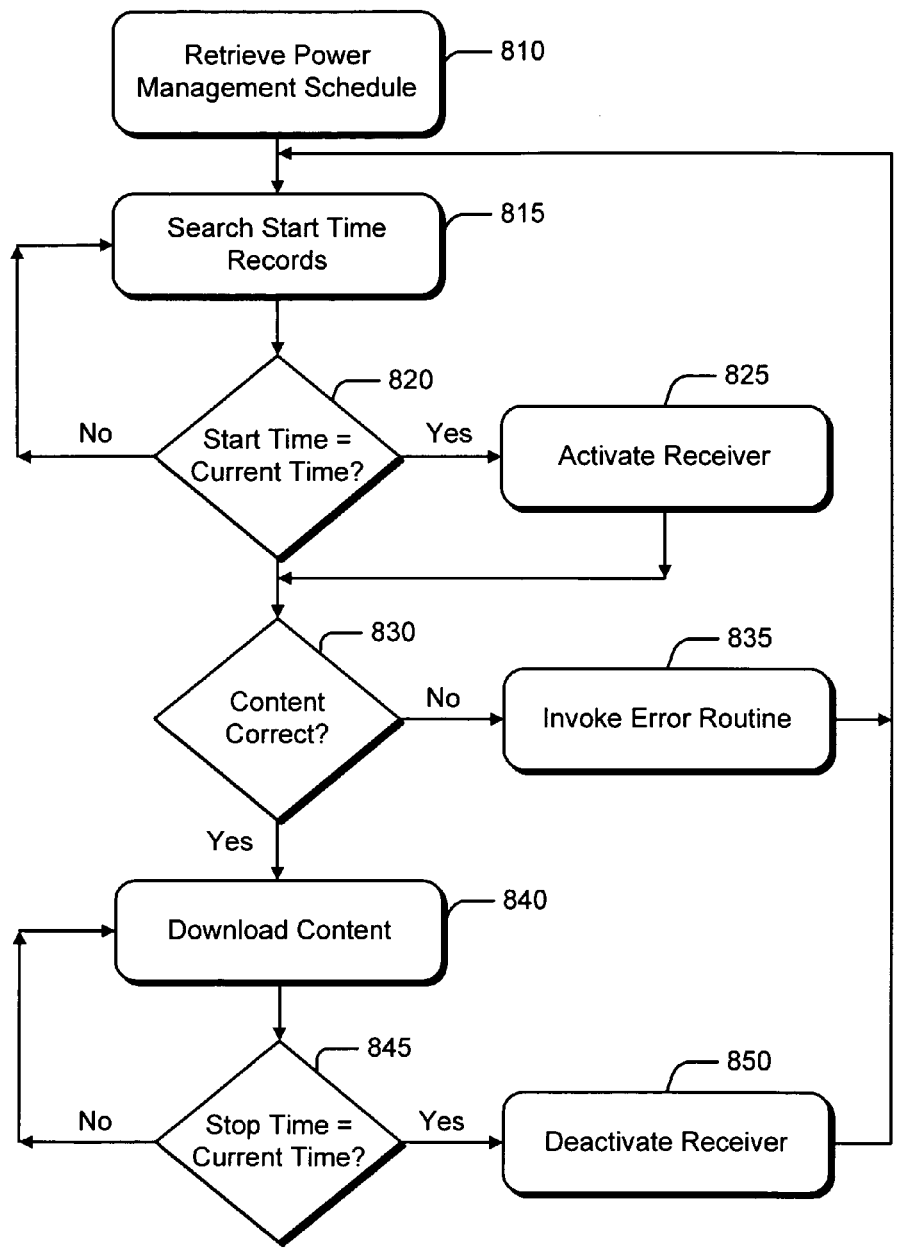
FIG. 8 is a flowchart illustrating operations in an exemplary process for managing the power consumption of data broadcasting receiver.

In operation, the power manager 324 uses the power management schedule 700 to selectively activate the receiver of the data broadcast receiving device 302, 304, 306, 308 at the start times indicated in the power management schedule 700 and to deactivate the receiver at the stop times indicated in the power management schedule 700. FIG. 8 is a flowchart illustrating operations in an exemplary process for managing the power consumption of data broadcasting receiver.

Referring to FIG. 8, at operation 810 the power manager 324 retrieves the power management schedule 700 from the receive schedule data files 330 in the memory 318 of the received device. At operations 815-820 the power manager 324 initiates a search through the power management schedule 700 to determine whether a record exists in the power management schedule 700 for which the start time is the current time (i.e., the current system time). If no such record exists, then the power manager 324 continues to monitor the management schedule 700 for a record in which the start time is the current time.

By contrast, if a record exists in which the start time is the current time (or if the start time minus the current time is less than a "warm up" threshold), then control passes to operation 825 and the receiver is activated to allow the receiving device to receive the content being broadcast by the particular head end 112, 122, 132 that is servicing the broadcast region 110, 120, 130 in which the receiving device is located.

When the receiver is activated, control passes to operation 830 and the power manager 323 determines whether the received content is correct, i.e., whether the content is consistent with the content indicated on the broadcast schedule. In an exemplary implementation the broadcast system broadcasts a content identifier with the content. The content identifier may be broadcast in-band or out-of-band in a separate communication channel. The content identifier may be embodied as a keyword or code that identifies the content being transmitted. This keyword or code may also be broadcast with the broadcast schedule 500, and stored in the power management schedule 700. The received content identifier may be compared with the code or keyword stored in the power management schedule. If there is correspondence between the received content identifier and the keyword or code in the power management schedule, then the content may be presumed correct and the download continues.

By contrast, if there is not correspondence between the received content identifier and the keyword or code in the power management table, then control passes to operation 835 and an error routine is invoked. In an exemplary implementation the error routine may comprise generating a signal that, when processed by the processing unit 316, creates an indication that the received content is not what was expected. Optionally, the error routine may deactivate the receiver. After the error routine is invoked control passes back to operations 815-820 and the power manager monitors the power management schedule for another broadcast scheduled to start at the current time.

If, at operation 830, the content is correct then control passes to operations 840-845 and the receiver downloads the content being broadcast until the current system time reaches the stop time identified in the power management table for the particular broadcast. The receiver is then deactivated (operation 850) and control passes back to operations 815-820, where the power manager monitors the broadcast schedule for the next scheduled broadcast.

Exemplary Computing Device

Figure 9:
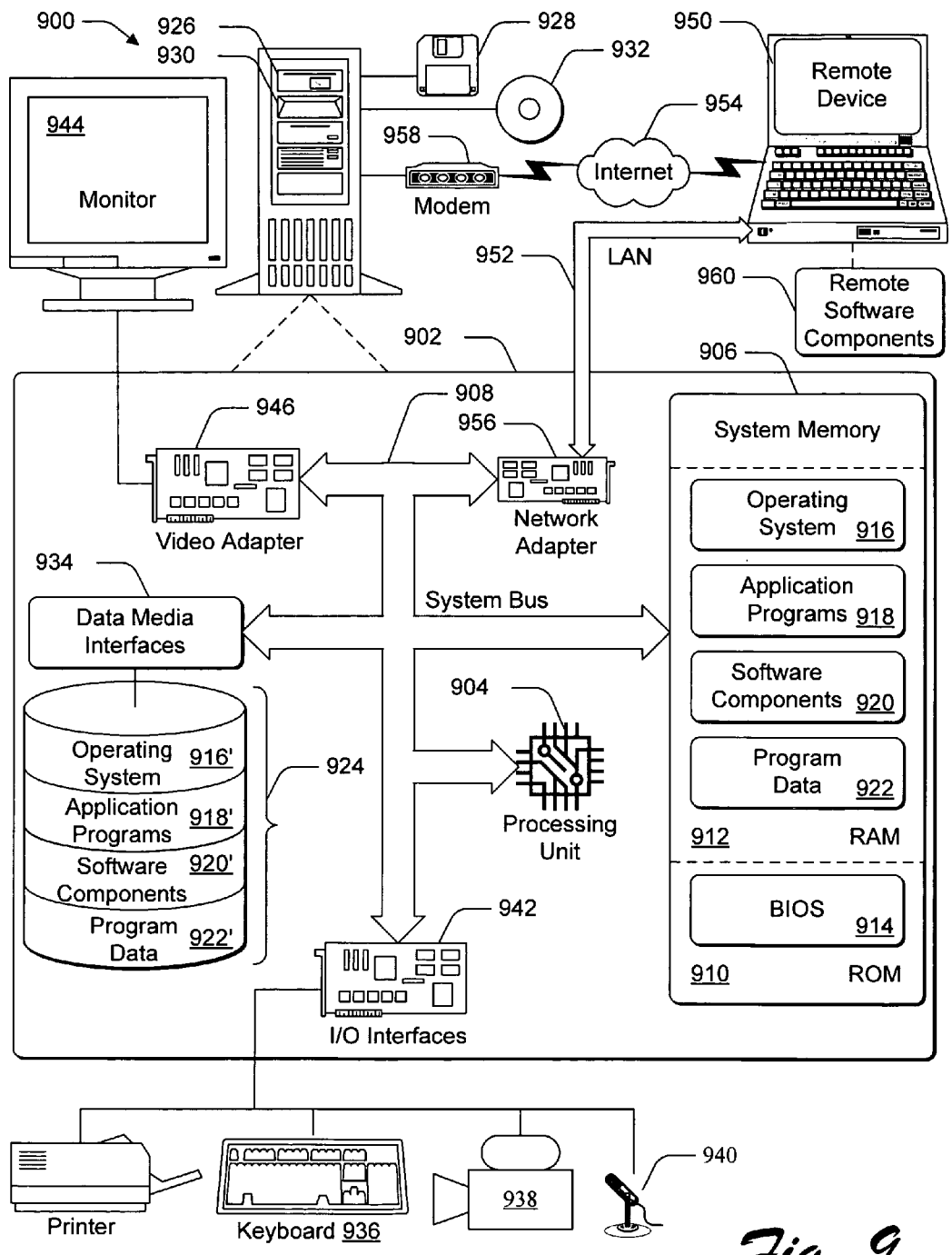
FIG. 9 is a schematic illustration of an exemplary computing device.

The various components and functionality described herein are implemented with a number of individual computers. FIG. 9 shows components of typical example of such a computer, referred by to reference numeral 900. The components shown in FIG. 9 are only examples, and are not intended to suggest any limitation as to the scope of the functionality of the invention; the invention is not necessarily dependent on the features shown in FIG. 9.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 9, the components of computer 900 may include, but are not limited to, a processing unit 904, a system memory 906, and a system bus 908 that couples various system components including the system memory to the processing unit 904. The system bus 908 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 900 typically includes a variety of computer-readable media. Computer-readable media can be any available media that can be accessed by computer 900 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 900. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 906 includes computer storage media in the form of volatile and/or nonvolatile memory such as read only memory (ROM) 910 and random access memory (RAM) 912. A basic input/output system 914 (BIOS), containing the basic routines that help to transfer information between elements within computer 900, such as during start-up, is typically stored in ROM 910. RAM 912 typically contains data and/or program modules that are immediately accessible to and/or presently being operated on by processing unit 904. By way of example, and not limitation, FIG. 9 illustrates operating system 916, application programs 918, other program modules 920, and program data 922.

The computer 900 may also include other removable/non-removable, volatile/nonvolatile computer storage media. By way of example only, FIG. 9 illustrates a hard disk drive 924 that reads from or writes to non-removable, nonvolatile magnetic media, a magnetic disk drive 926 that reads from or writes to a removable, nonvolatile magnetic disk 928, and an optical disk drive 930 that reads from or writes to a removable, nonvolatile optical disk 932 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 924 is typically connected to the system bus 908 through a non-removable memory interface such as data media interface 934, and magnetic disk drive 926 and optical disk drive 930 are typically connected to the system bus 908 by a removable memory interface.

The drives and their associated computer storage media discussed above and illustrated in FIG. 9 provide storage of computer-readable instructions, data structures, program modules, and other data for computer 900. In FIG. 9, for example, hard disk drive 924 is illustrated as storing operating system 916', application programs 918', other program modules 920', and program data 922'. Note that these components can either be the same as or different from operating system 916, application programs 918, other program modules 920, and program data 922. Operating system 916, application programs 918, other program modules 920, and program data 922 are given different numbers here to illustrate that, at a minimum, they are different copies. A user may enter commands and information into the computer 900 through input devices such as a keyboard 936, a mouse, trackball, or touch pad. Other input devices (not shown) may include a microphone, joystick, game pad, satellite dish, scanner, or the like. These and other input devices are often connected to the processing unit 904 through an input/output (I/O) interface 942 that is coupled to the system bus, but may be connected by other interface and bus structures, such as a parallel port, game port, or a universal serial bus (USB). A monitor 944 or other type of display device is also connected to the system bus 908 via an interface, such as a video adapter 946. In addition to the monitor 944, computers may also include other peripheral output devices (e.g., speakers) and one or more printers, which may be connected through the I/O interface 942.

The computer may operate in a networked environment using logical connections to one or more remote computers, such as a remote computing device 950. The remote computing device 950 may be a personal computer, a server, a router, a network PC, a peer device or other common network node, and typically includes many or all of the elements described above relative to computer 900. The logical connections depicted in FIG. 9 include a local area network (LAN) 952 and a wide area network (WAN) 954. Although the WAN 954 shown in FIG. 9 is the Internet, the WAN 954 may also include other networks. Such networking environments are commonplace in offices, enterprise-wide computer networks, intranets, and the like.

When used in a LAN networking environment, the computer 900 is connected to the LAN 952 through a network interface or adapter 956. When used in a WAN networking environment, the computer 900 typically includes a modem 958 or other means for establishing communications over the Internet 954. The modem 958, which may be internal or external, may be connected to the system bus 908 via the I/O interface 942, or other appropriate mechanism. In a networked environment, program modules depicted relative to the computer 900, or portions thereof, may be stored in the remote computing device 950. By way of example, and not limitation, FIG. 9 illustrates remote application programs 960 as residing on remote computing device 950. It will be appreciated that the network connections shown are exemplary and other means of establishing a communication link between the computers may be used.

CONCLUSION

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

We claim:
1. A method, comprising:
  storing, at a battery powered computing device, profile information reflecting categories of interest for a user;
  activating, at a first time, a receiver module of the battery powered computing device to receive, at the battery powered computing device, broadcast schedule information from a broadcast server device, the broadcast schedule information relating to a plurality of content files having associated content identifiers, associated broadcast start times, and associated broadcast stop times;
  searching the broadcast schedule information for the categories of interest to select one or more of the content files matching at least one of the categories of interest;

conserving battery resources of the battery powered computing device by:
constructing a power management schedule for the battery powered computing device using the content identifiers and the broadcast start times for the one or more matching content files from the broadcast schedule information;
deactivating the receiver module prior to the broadcast start times for the one or more matching content files such that the battery powered computing device cannot receive the one or more matching content files and cannot receive the content identifiers for the one or more matching content files;
reactivating the receiver module of the battery powered computing device at a second, subsequent time indicated in the power management schedule for a first one of the matching content files;
receiving, with the reactivated receiver module at the second time, broadcast data that includes a content portion and a content identifier that identifies the received content portion, wherein the content identifier that identifies the received content portion is received out-of-band on a separate communication channel from the received content portion;
determining, in a first instance, that the identifier of the first matching content file received at the first time does not match the content identifier received at the second time;
responsive to the determining in the first instance, generating a signal to deactivate the receiver module prior to the broadcast stop time for the first matching content file;
determining, in a second instance, that the identifier of the first matching content file received at the first time does match the content identifier received at the second time; and
responsive to the determining in the second instance, generating the signal to deactivate the receiver module approximately at the broadcast stop time for the first matching content file.

2. The method of claim 1, wherein the broadcast schedule information is received from the broadcast server device over a control channel between the broadcast server device and the battery powered computing device.

3. The method of claim 2, further comprising:
periodically activating the receiver module in the battery powered computing device, including at the first time; and
receiving the broadcast schedule information over the control channel;
wherein deactivating the receiver module is also performed periodically.

4. The method of claim 1, further comprising:
storing the received broadcast schedule information in a data store.

5. The method of claim 1, wherein the content identifier is located in metadata of the received broadcast data.

6. A battery powered computing device, comprising:
a receiver;
a processor; and
a memory module operatively connected to the processor and comprising logic instructions which, when executed, configure the processor to control the receiver in a battery resource conserving manner to:
store, at the battery powered computing device, profile information reflecting categories of interest for a user;
activate, at a first time, the receiver of the battery powered computing device to receive, at the battery powered computing device, broadcast schedule information from a broadcast server device, the broadcast schedule information relating to a plurality of content files having associated content identifiers, associated broadcast start times, and associated broadcast stop times;
search the broadcast schedule information for the categories of interest to select one or more of the content files matching at least one of the categories of interest;
construct a power management schedule for the battery powered computing device using the content identifiers and the broadcast start times for the one or more matching content files from the broadcast schedule information;
deactivate the receiver prior to the broadcast start times for the one or more matching content files such that the battery powered computing device cannot receive the one or more matching content files and cannot receive the content identifiers for the one or more matching content files;
reactivate the receiver of the battery powered computing device at a second, subsequent time indicated in the power management schedule for a first one of the matching content files;
receive, with the reactivated receiver at the second time, broadcast data that includes a content portion and a content identifier that identifies the received content portion, wherein the content identifier that identifies the received content portion is received out-of-band on a separate communication channel from the received content portion;
determine, in a first instance, that the identifier of the first matching content file received at the first time does not match the content identifier received at the second time;
responsive to the first instance, generate a signal to deactivate the receiver prior to the broadcast stop time for the first matching content file;
determine, in a second instance, that the identifier of the first matching content file received at the first time does match the content identifier received at the second time; and
responsive to the second instance, generate the signal to deactivate the receiver approximately at the broadcast stop time for the first matching content file.

7. One or more computer-readable storage devices comprising executable instructions that, when executed by one or more processors, perform acts comprising:
storing, at a battery powered computing device, profile information reflecting categories of interest for a user;
activating, at a first time, a receiver module of the battery powered computing device to receive, at the battery powered computing device, broadcast schedule information from a broadcast server device, the broadcast schedule information relating to a plurality of content files having associated content identifiers, associated broadcast start times, and associated broadcast stop times;
searching the broadcast schedule information for the categories of interest to select one or more of the content files matching at least one of the categories of interest;
conserving battery resources of the battery powered computing device by:
constructing a power management schedule for the battery powered computing device using the content identifiers and the broadcast start times for the one or more matching content files from the broadcast schedule information;

deactivating the receiver module prior to the broadcast start times for the one or more matching content files such that the battery powered computing device cannot receive the one or more matching content files and cannot receive the content identifiers for the one or more matching content files;

reactivating the receiver module of the battery powered computing device at a second, subsequent time indicated in the power management schedule for a first one of the matching content files;

receiving, with the reactivated receiver module at the second time, broadcast data that includes a content portion and a content identifier that identifies the received content portion, wherein the content identifier that identifies the received content portion is received out-of-band on a separate communication channel from the received content portion;

determining, in a first instance, that the identifier of the first matching content file received at the first time does not match the content identifier received at the second time;

responsive to the determining in the first instance, generating a signal to deactivate the receiver module prior to the broadcast stop time for the first matching content file;

determining, in a second instance, that the identifier of the first matching content file received at the first time does match the content identifier received at the second time; and responsive to the determining in the second instance, generating the signal to deactivate the receiver module approximately at the broadcast stop time for the first matching content file.

8. The one or more computer-readable storage devices according to claim 7, wherein:

the first matching content file relates to a specific sports team that is identified by an individual category of interest.

9. The one or more computer-readable storage devices according to claim 7, wherein:

the first matching content file relates to a stock quote for a specific stock that is identified by an individual category of interest.

10. The one or more computer-readable storage devices according to claim 7, comprising further executable instructions that, when executed by the one or more processors, perform further acts comprising:

receiving new broadcast schedule information responsive to entering a new geographic region, wherein the broadcast schedule information is associated with a previous geographic region where the battery powered computing device was located before entering the new geographic region.

11. The one or more computer-readable storage devices according to claim 10, comprising further executable instructions that, when executed by the one or more processors, perform further acts comprising:

constructing a new power management schedule for the new geographic region using the new broadcast schedule information.

12. The one or more computer-readable storage devices according to claim 7, wherein the content identifier of the received content portion comprises a keyword.

13. The one or more computer-readable storage devices according to claim 7, wherein the content identifier of the received content portion comprises a code that is not a keyword.

14. The one or more computer-readable storage devices according to claim 7, wherein the first matching content file relates to a mortgage rate and the first matching content file matches an individual category of interest relating to finance.

15. The one or more computer-readable storage devices according to claim 7, wherein the first matching content file relates to a soccer team that is identified by an individual category of interest relating to sports.

16. The one or more computer-readable storage devices according to claim 7, comprising further executable instructions that, when executed by the one or more processors, perform further acts comprising:

modifying a periodicity with which an individual content file is broadcast based on an instruction from the user.

17. The one or more computer-readable storage devices according to claim 7, wherein the individual content file includes a stock quote for a specific stock such that modifying the periodicity determines a frequency with which updated stock quotes for the specific stock are received.

18. The one or more computer-readable storage devices according to claim 7, comprising further executable instructions that, when executed by the one or more processors, perform further acts comprising:

adding and deleting individual content files from the broadcast schedule information based on an instruction from the user.

* * * * *